United States Patent
Cohen et al.

(10) Patent No.: US 8,055,454 B2
(45) Date of Patent: Nov. 8, 2011

(54) FACILITATING MOTE NETWORK CONFIGURATION AND LAYOUT USING MECHANICAL DISTURBANCES

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1791 days.

(21) Appl. No.: 11/203,566

(22) Filed: Aug. 12, 2005

(65) Prior Publication Data

US 2007/0035409 A1 Feb. 15, 2007

(51) Int. Cl.
*G06F 19/00* (2011.01)
*G06F 17/40* (2006.01)

(52) U.S. Cl. .............. 702/33; 73/570; 73/584; 181/125; 370/254; 702/150; 702/187; 702/189

(58) Field of Classification Search .................... 73/570, 73/584, 587, 645, 646, 649; 181/101, 108, 181/112, 125; 250/253, 491.1; 356/3, 3.01, 356/614, 623, 625, 634; 367/13, 87, 99, 367/118, 124, 125, 126, 127; 702/1, 34, 702/56, 108, 127, 150, 155, 158, 187, 188, 702/189, 33; 709/220, 221, 222; 713/1, 713/400, 600; 370/254
See application file for complete search history.

(56) References Cited

U.S. PATENT DOCUMENTS

| | | | | |
|---|---|---|---|---|
| 2,993,203 A * | 7/1961 | Hulst | ................... | 342/387 |
| 3,005,200 A * | 10/1961 | O'Meara | ................... | 342/439 |
| 3,064,897 A * | 11/1962 | Bailey et al. | ................... | 702/151 |
| 3,068,474 A * | 12/1962 | Higgins et al. | ................... | 342/444 |
| 3,130,385 A * | 4/1964 | Galloway | ................... | 367/120 |
| 3,130,408 A * | 4/1964 | Kumano | ................... | 342/378 |
| 3,137,854 A * | 6/1964 | Anderson | ................... | 342/463 |
| 3,153,237 A * | 10/1964 | Lakatos | ................... | 342/393 |
| 3,268,895 A * | 8/1966 | Dering | ................... | 342/458 |
| 5,382,943 A * | 1/1995 | Tanaka | ................... | 340/539.22 |
| 6,414,955 B1 | 7/2002 | Clare et al. | | |
| 6,650,877 B1 * | 11/2003 | Tarbouriech et al. | ...... | 455/186.1 |
| 6,697,300 B1 | 2/2004 | Holt | | |
| 6,795,786 B2 | 9/2004 | LaMarca et al. | | |

(Continued)

FOREIGN PATENT DOCUMENTS

KR 722799 B1 * 5/2007

(Continued)

OTHER PUBLICATIONS

Kamin Whitehouse & Xiaofan Jiang, Calamari: a sensor field localization system, http://www.cs.berkeley.edu/~kamin/calamari/.

(Continued)

*Primary Examiner* — Edward Cosimano (57) ABSTRACT

A method may include and/or involve at least one mote of a mote network detecting a mechanical disturbance, and the at least one mote applying information about when the mechanical disturbance was detected in order to facilitate determination of a location of the at least one mote with respect to at least one other mote.

31 Claims, 2 Drawing Sheets

U.S. PATENT DOCUMENTS

| | | |
|---|---|---|
| 6,832,251 B1 | 12/2004 | Gelvin |
| 6,847,587 B2 * | 1/2005 | Patterson et al. ............ 367/127 |
| 7,362,270 B2 * | 4/2008 | Srinivasan et al. ........... 342/458 |
| 7,433,266 B2 * | 10/2008 | Ledeczi et al. ............... 367/129 |
| 7,474,589 B2 * | 1/2009 | Showen et al. ............... 367/127 |
| 7,558,156 B2 * | 7/2009 | Vook et al. ................... 367/127 |
| 7,586,812 B2 * | 9/2009 | Baxter et al. ................. 367/127 |
| 7,599,252 B2 * | 10/2009 | Showen et al. ............... 367/127 |
| 2003/0228025 A1 | 12/2003 | Hannah |
| 2004/0100868 A1 * | 5/2004 | Patterson et al. ............ 367/127 |
| 2004/0128097 A1 | 7/2004 | LaMarca et al. |
| 2004/0133786 A1 * | 7/2004 | Tarbouriech ................. 713/185 |
| 2004/0139110 A1 | 7/2004 | LaMarca et al. |
| 2007/0159924 A1 * | 7/2007 | Vook et al. ................... 367/127 |
| 2007/0230269 A1 * | 10/2007 | Ledeczi et al. ............... 367/117 |
| 2007/0257839 A1 * | 11/2007 | Srinivasan et al. ........... 342/360 |
| 2008/0084788 A1 * | 4/2008 | Showen et al. ............... 367/127 |
| 2008/0165621 A1 * | 7/2008 | Fisher et al. .................. 367/118 |
| 2008/0219100 A1 * | 9/2008 | Fisher et al. .................. 367/124 |
| 2008/0267013 A1 * | 10/2008 | Fisher et al. .................. 367/127 |
| 2008/0279046 A1 * | 11/2008 | Showen et al. ............... 367/127 |
| 2008/0291042 A1 * | 11/2008 | Soares, Jr. .................... 340/686.1 |
| 2009/0086577 A1 * | 4/2009 | Ledeczi et al. ............... 367/129 |

FOREIGN PATENT DOCUMENTS

SU 1334074 A * 8/1987

OTHER PUBLICATIONS

Bob Grabowski, Luis Navarro-Serment & Curt Bererton, Millibots Localization System, http://www.contrib.andrew.cmu.edu/~rjg/millibots/millibot_localization.html.

* cited by examiner

FACILITATING MOTE NETWORK CONFIGURATION AND LAYOUT USING MECHANICAL DISTURBANCES

TECHNICAL FIELD

The present disclosure relates to mote networks.

BACKGROUND

Mote sensors may be distributed in manners that cause the layout of the sensors to be less than fully understood. It may thus be desirable to incorporate facilities to enable determination of mote sensor layout subsequent to distribution.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve at least one mote of a mote network detecting a mechanical disturbance, and the at least one mote applying information about when the mechanical disturbance was detected in order to facilitate determination of a location of the at least one mote with respect to at least one other mote. The at least one mote of a mote network detecting a mechanical disturbance may include and/or involve the at least one mote applying a sensor element tuned to one or more particular mechanical wave frequencies, and/or the at least one mote applying signal processing logic to facilitate detection of the mechanical disturbance, and/or the at least one mote detecting one or more of a strength, frequency, duration, or repetition of the mechanical disturbance, and/or the at least one mote sharing information about when the mechanical disturbance was detected in order to facilitate a determination of a distance between the at least one mote and the at least one other mote, and/or the at least one mote applying information about when the mechanical disturbance was detected in order to facilitate determination of which one or more motes are nearest neighbors. The at least one mote detecting one or more of a strength, frequency, duration, or repetition of the mechanical disturbance may include and/or involve the at least one mote detecting one or more patterns of repetition of the mechanical disturbance. In addition to the foregoing, other method aspects are described in the claims, drawings, and text forming a part of the present application.

The method may include and/or involve the at least one mote providing a response signal to the mechanical disturbance. The at least one mote providing a response signal to the mechanical disturbance may include and/or involve the at least one mote providing a mechanical and/or visual response signal. In addition to the foregoing, other method aspects are described in the claims, drawings, and text forming a part of the present application.

The method may include and/or involve the at least one mote responding to different mechanical disturbance characteristics than the at least one other mote. The at least one mote responding to different mechanical disturbance characteristics than the at least one other mote may include and/or involve the at least one mote responding to at least one of a different frequency, volume, tone, pitch, or pattern of mechanical disturbance than the at least one other mote. In addition to the foregoing, other method aspects are described in the claims, drawings, and text forming a part of the present application.

The method may include and/or involve varying one or more mechanical disturbances according to one or more signals received from the at least one mote or the at least one other mote. In addition to the foregoing, other method aspects are described in the claims, drawings, and text forming a part of the present application.

The method may include and/or involve the at least one mote responding to the mechanical disturbance with information about one or more of an intensity of the disturbance, frequency, tone, and/or pitch of the disturbance, mote identification, mote status, or location of the mote or motes that detected the disturbance. The at least one mote responding to the mechanical disturbance with information about one or more of an intensity of the disturbance, frequency, tone, and/or pitch of the disturbance, mote identification, mote status, or location of the mote or motes that detected the disturbance may include and/or involve the at least one mote storing the one or more of an intensity of the disturbance, frequency, tone, and/or pitch of the disturbance, mote identification, mote status, or location of the mote or motes that detected the disturbance, and/or the at least one mote communicating to one or more neighboring motes the one or more of an intensity of the disturbance, frequency, tone, and/or pitch of the disturbance, mote identification, mote status, or location of the mote or motes that detected the disturbance. In addition to the foregoing, other method aspects are described in the claims, drawings, and text forming a part of the present application.

The method may include and/or involve the at least one mote applying a filter to enhance detection of one or more mechanical waves of one or more particular frequencies, and/or to attenuate the one or more mechanical waves of one or more particular frequencies. In addition to the foregoing, other method aspects are described in the claims, drawings, and text forming a part of the present application.

The method may include and/or involve the at least one mote receiving an indication to be alert for the mechanical disturbance prior to detecting the mechanical disturbance. The at least one mote receiving an indication to be alert for the mechanical disturbance prior to detecting the mechanical disturbance may include and/or involve the indication to be alert communicated to the at least one mote via one or more electromagnetic waves, and/or the at least one mote receiving an indication of when the mechanical disturbance will be generated. The indication to be alert communicated to the at least one mote via one or more electromagnetic waves may include and/or involve the indication to be alert communicated to the at least one mote via at least one neighboring mote of the at least one mote, and/or the indication to be alert communicated to the at least one mote via at least one of Bluetooth, RFID, Wi-Fi, or other type of radio wave, and/or the indication to be alert communicated to the at least one mote via at least one of visible, infrared, ultraviolet, or other type of light. The at least one mote receiving an indication of when the mechanical disturbance will be generated may include and/or involve the at least one mote receiving an indication of an absolute time when the mechanical disturbance will be generated, and/or an indication of a relative time when the mechanical disturbance will be generated. In addition to the foregoing, other method aspects are described in the claims, drawings and text forming a part of the present application.

The method may include and/or involve the at least one mote noting a time that the mechanical disturbance was received relative to time when the timing was started. In addition to the foregoing, other method aspects are described in the claims, drawings, and text forming a part of the present application.

The method may include and/or involve two or more motes maintaining one or more synchronized clocks. In addition to the foregoing, other method aspects are described in the claims, drawings, and text forming a part of the present application.

The method may include and/or involve the at least one mote recording an absolute time at which the mechanical disturbance is received by the at least one mote. In addition to the foregoing, other method aspects are described in the claims, drawings, and text forming a part of the present application.

The method may include and/or involve the at least one mote prior to receiving a mechanical disturbance receiving an indication of a time at which the at least one mote should synchronize a clock with at least one other mote. In addition to the foregoing, other method aspects are described in the claims, drawings, and text forming a part of the present application.

The method may include and/or involve the at least one mote and at least one other mote synchronizing one or more clocks at the time indicated by the indication. In addition to the foregoing, other method aspects are described in the claims, drawings, and text forming a part of the present application.

The method may include and/or involve at least one mote of a mote network detecting a mechanical disturbance, and the at least one mote communicating to a central processing facility information about when the mechanical disturbance was detected in order to facilitate a determination by the central processing facility of a location of the at least one mote. The at least one mote of a mote network detecting a mechanical disturbance may include and/or involve at least one mote applying a sensor element tuned to one or more particular mechanical wave frequencies, and/or at least one mote applying signal processing logic to facilitate detection of the mechanical disturbance, and/or at least one mote detecting one or more of a strength, frequency, duration, or repetition of the mechanical disturbance. In addition to the foregoing, other method aspects are described in the claims, drawings, and text forming a part of the present application.

The method may include and/or involve applying information about one or more properties of one or more media through which the mechanical disturbance propagates to facilitate the determination of the location of the motes. In addition to the foregoing, other method aspects are described in the claims, drawings and text forming a part of the present application.

The method may include and/or involve at least one mote of a mote network detecting a mechanical disturbance, and the at least one mote communicating to a central processing facility information about when the mechanical disturbance was detected in order to facilitate a determination by the central processing facility of a shape of an object or objects including the at least one mote. The at least one mote of a mote network detecting a mechanical disturbance may include and/or involve at least one mote applying a sensor element tuned to one or more particular mechanical wave frequencies, and/or at least one mote applying signal processing logic to facilitate detection of the mechanical disturbance, and/or at least one mote detecting one or more of a strength, frequency, duration, or repetition of the mechanical disturbance. In addition to the foregoing, other method aspects are described in the claims, drawings, and text forming a part of the present application.

The method may include and/or involve at least one mote detecting a first mechanical disturbance, the at least one mote recording an indication of when the first mechanical disturbance was detected, the at least one mote detecting a second mechanical disturbance, the at least one mote recording an indication of when the second mechanical disturbance was detected, and the at least one mote applying information about when the first and second mechanical disturbances were detected in order to facilitate determination of a location of the at least one mote with respect to at least one other mote. In addition to the foregoing, other method aspects are described in the claims, drawings, and text forming a part of the present application.

A system utilizing at least one mote, wherein the mote may include and/or involve logic to detect a mechanical disturbance, and logic to apply information about when the mechanical disturbance was detected toward determination of a location of the at least one mote with respect to at least one other mote. The logic to apply information about when the mechanical disturbance was detected toward determination of a location of the at least one mote with respect to at least one other mote may include and/or involve applying one or more differences between when the mechanical disturbance was detected by the mote and when the mechanical disturbance was detected by at least one other mote, and/or logic to detect one or more of a strength, frequency, duration, or repetition of the mechanical disturbance, and/or logic to share with at least one other mote information about when the mechanical disturbance was detected in order to facilitate a determination of a location of the mote relative to the at least one other mote, and/or logic to apply information about when the mechanical disturbance was detected in order to facilitate determination of which one or more motes are nearest neighbors of the mote. The logic to detect one or more of a strength, frequency, duration, or repetition of the mechanical disturbance may include and/or involve logic to detect one or more patterns of repetition of the mechanical disturbance. In addition to the foregoing, other system aspects are described in the claims, drawings, and text forming a part of the present application.

The mote may include and/or involve logic to provide a response signal to the mechanical disturbance. The logic to provide a response signal to the mechanical disturbance may include and/or involve logic to provide a mechanical and/or visual response signal. In addition to the foregoing, other system aspects are described in the claims, drawings, and text forming a part of the present application.

The mote may include and/or involve logic to respond to the mechanical disturbance with information about one or more of an intensity of the disturbance, frequency, tone, and/or pitch of the disturbance, mote identification, mote status, or location of the mote or motes that detected the disturbance. The logic to respond to the mechanical disturbance with information about one or more of an intensity of the disturbance, frequency, tone, and/or pitch of the disturbance, mote identification, mote status, or location of the mote or motes that detected the disturbance may include and/or involve logic to store the one or more of an intensity of the disturbance, frequency, tone, and/or pitch of the disturbance, mote identification, mote status, or location of the mote or motes that detected the disturbance, and/or logic to communicate to one or more neighboring motes the one or more of an intensity of the disturbance, frequency, tone, and/or pitch of the disturbance, mote identification, mote status, or location of the mote or motes that detected the disturbance. In addition to the foregoing, other system aspects are described in the claims, drawings, and text forming a part of the present application.

The mote may include and/or involve a sensor element tuned to one or more particular mechanical wave frequencies. In addition to the foregoing, other system aspects are described in the claims, drawings, and text forming a part of the present application.

The mote may include and/or involve signal processing logic to facilitate detection of the mechanical disturbance. In addition to the foregoing, other system aspects are described in the claims, drawings, and text forming a part of the present application.

The mote may include and/or involve filter logic to enhance detection of one or more mechanical waves of one or more particular frequencies, and/or to attenuate one or more mechanical waves of one or more particular frequencies. In addition to the foregoing, other system aspects are described in the claims, drawings, and text forming a part of the present application.

The mote may include and/or involve logic to apply a received indication to be alert for the mechanical disturbance prior to detecting the mechanical disturbance. The logic to apply a received indication to be alert for the mechanical disturbance prior to detecting the mechanical disturbance may include and/or involve logic to receive the indication to be alert for the mechanical disturbance via one or more electromagnetic waves, and/or logic to receive and apply an indication of when the mechanical disturbance will be generated. The logic to receive the indication to be alert for the mechanical disturbance via the one or more electromagnetic waves may include and/or involve logic to receive the alert from at least one neighboring mote of the mote, and/or logic to receive the indication to be alert via at least one of Bluetooth, RFID, Wi-Fi, or other type of radio wave, and/or logic to receive the indication to be alert via at least one of visible, infrared, ultraviolet, or other type of light. The logic to receive and apply an indication of when the mechanical disturbance will be generated may include and/or involve logic to receive and apply an indication of an absolute time when the mechanical disturbance will be generated, and/or logic to receive and apply an indication of a relative time when the mechanical disturbance will be generated. The logic to receive and apply an indication of when the mechanical disturbance will be generated may include and/or involve logic to record a time that the mechanical disturbance was received relative to the time when the mechanical disturbance will be generated. In addition to the foregoing, other system aspects are described in the claims, drawings, and text forming a part of the present application.

The mote may include and/or involve logic to synchronize one or more clocks with at least one other mote. In addition to the foregoing, other system aspects are described in the claims, drawings, and text forming a part of the present application.

The mote may include and/or involve logic to record an absolute time at which the mechanical disturbance is received. In addition to the foregoing, other apparatus aspects are described in the claims, drawings, and text forming a part of the present application.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

System for Acoustic Stimulation of a Mote Network

Figure 1:
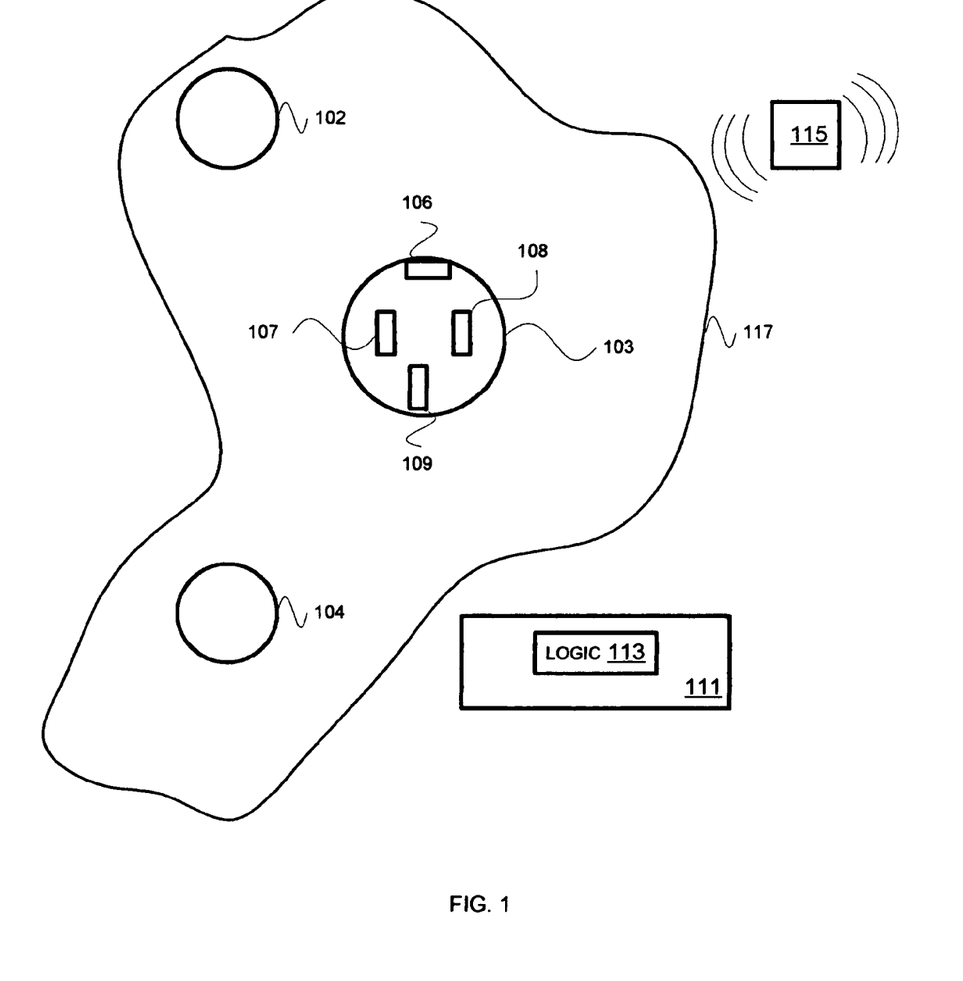
FIG. 1 is a block diagram of an embodiment of a system for acoustic stimulation of a mote network.

FIG. 1 is a block diagram of an embodiment of a system for acoustic stimulation of a mote network.

A mote network within a volume/area 117 includes multiple mote sensor/processors. For purposes of illustration, three motes 102, 103, and 104 are shown, although in practice the network could have more or fewer (typically more) motes than this. Mote 103 is shown in more detail, having a communication interface 106, a mechanical disturbance sensor 107, clock logic 108, and other logic 109 to carry out/participate in various acts as described herein.

The system further includes at least one external processing facility 111 having its own logic 113 to carry out/participate in acts described herein, and at least one mechanical disturbance generator 115.

At least one mote of the mote network may detect a mechanical disturbance (henceforth, 'disturbance detection') produced by the disturbance generator 115, and apply information about when the mechanical disturbance was detected to facilitate determination of a location of the at least one mote with respect to at least one other mote.

Disturbance detection may involve a mote applying a sensor element such as 107 tuned to one or more particular mechanical wave frequencies. One way to accomplish this is to create a sensor using an object having a natural resonance frequency, for example a rectangular or circular membrane or an object with one attached and one free end such as a tuning fork. Such a sensor may strongly respond to (and thus detect) a mechanical wave at the resonance frequency (and possibly harmonics thereof) but only faintly if at all respond to (and thus not detect) waves at other frequencies.

A mote or motes may include and apply signal processing logic to facilitate detection of the mechanical disturbance. Such processing may include filtering out probable noise and signals of certain frequencies, normalizing signal strength, and/or providing analog to digital conversion. One or more digital filters may be applied to enhance detection of one or more mechanical waves of one or more particular frequencies, and/or to attenuate one or more mechanical waves of one or more particular frequencies. For example, the mechanical sensor 107 on mote 103 may incorporate a microphone responsive to a wide range of mechanical waves (sound input, in this case). Sound input received by the microphone may be repeated sampled and stored within the mote 103 as raw digital values. Logic 109 may analyze the raw digital values and eliminate values obtained from sound above a high cutoff frequency or below a low cutoff frequency, thus performing digital bandpass filtering of the received inputs. The final result of the processing by the microphone and the filtering logic may be used by the rest of the mote components as if a tuned, resonance sensor was present.

Disturbance detection may also involve a mote detecting one or more of a strength, frequency, duration, or repetition of the mechanical disturbance (henceforth, 'disturbance attribute determination'). Disturbance attribute determination may in some cases involve detecting one or more patterns of repetition of the mechanical disturbance. Recognition of one or some of these characteristics may facilitate the mote recognizing that the disturbance is not noise. For example, a disturbance which is recognized as a sound of certain duration (say approximately one second) repeated (say three times every five seconds) would be unlikely to be noise. Besides noise detection, the extra information conveyed by disturbance attribute determination may also be used in other ways by a mote. For example, the mote may be able to identify which of several possible actions it is being indicated to take in response to the disturbance.

Two or more motes may share information about when the mechanical disturbance was detected in order to facilitate a determination of a distance between the motes (henceforth, 'location determination'. Location determination may in some instances involve motes applying information about when the mechanical disturbance was detected in order to facilitate determination of which motes are nearest neighbors. For example, mote 103 might calculate the difference in time between its reception of the disturbance and mote 102's. Mote 103 might also perform this calculation with respect to mote 104. Mote 103 might then recognize the mote which received the disturbance at the closest time to it 103 as being its nearest neighbor. The mote receiving the disturbance at the time most different from it 103 might be determined to be its furthest neighbor.

Motes may provide, for example via a communications interface 106, a response signal to the mechanical disturbance (henceforth, 'disturbance response'). Disturbance response may include and/or involve at least one mote providing a mechanical and/or visual response signal. For example, the mechanical sensor 107 may incorporate an element capable of vibrating at a certain frequency, which it may do as a part of the disturbance response. As another example, a mote (not shown) may include an LED which it may light up for a certain length of time, providing a visual disturbance response of particular wavelength(s).

Motes of the network may respond to different mechanical disturbance characteristics (henceforth, 'disturbance response distinction'). Disturbance response distinction may include and/or involve motes responding to different frequencies, volumes, tones, pitches, or patterns of mechanical disturbance. Disturbance response distinction may occur when a network has several types of motes, and each responds to a particular disturbance pattern. For example, motes with pressure sensors may respond with a visual response to disturbances of frequency A. Motes with temperature sensors may respond with a visual response to disturbances of frequency B.

Disturbance response distinction may also or alternatively occur when a network has at least one mote able to distinguish between disturbance types. For example, a mote may respond to a disturbance of frequency A of particular duration and number of repetitions by broadcasting its name (an identifier) and when it first received the disturbance. At approximately the same time, it may receive similar information from some of the other motes in the network. When the mote receives a disturbance of frequency A with different duration and repetitions, it may respond by broadcasting its calculated neighbor information. In response to either disturbance type, the mote may also selectively pass on to other motes the information it is receiving, thus propagating the information for ultimate receipt by one or more processing facilities, such as the external processing facility 111.

Disturbance response may involve the communication of information, for example via a communications interface 106. For example, a mote may respond to the mechanical disturbance with information about one or more of an intensity of the disturbance, frequency, tone, and/or pitch of the disturbance, mote identification, mote status, or location of the mote or motes that detected the disturbance. One manner of implementing disturbance response may include and/or involve a mote storing this information (for example via logic 109 which may include memory facilities), and/or communicating this information to one or more neighboring motes. In other embodiments, information may be communicated to one or more processing facilities external to the mote network.

In some cases, mechanical disturbances applied by generator 115 to the network may be varied according to signals received from the motes. For example, the generator 115 may initially generate a disturbance of certain strength, say a sound of certain frequency at 12 db (a person would hear this as a very soft sound or not at all). The external processing facility 111 may expect to receive a response from one or more motes, including mote 104, communicating the nearest neighbor network topology the motes 102-104 calculated as a result of the disturbance. However, after a certain time interval the logic 113 of the processing facility 111 may recognize that no such communication was received. The logic 113 may recognize that one reason this undesired result could occur is that some or all of the motes 102-104 did not receive or recognize the disturbance. The processing facility 111 may then "try again" by commanding the generator 115 to generate a second disturbance of the same frequency but with 30 db of strength. In a second example, motes in a network may be expected to light up an LED (e.g. provide a light response) after receipt of a disturbance. If less than half the expected number of lights occur after the disturbance, the disturbance generator may be signaled to send a second disturbance which varies in some manner, for example is of longer duration and is repeated more times.

Pre-Notification and/or Synchronization

The system may provide one or more motes of the network with one or more indications to be alert for the mechanical disturbance (henceforth, 'pre-notification'). In some embodiments the external processing facility 111 may provide the pre-notification, and may collect disturbance responses. Pre-notification may involve an alert(s) communicated to one or more motes via one or more electromagnetic waves, and may in some cases include an indication of when the mechanical disturbance will be generated. Pre-notification communication may be communicated to one or more motes, which in turn communicate the pre-notification to neighboring motes (e.g. via interface 106). Pre-notification alerts may be communicated, for example, via Bluetooth, RFID, Wi-Fi, or other type of radio wave. In some implementations pre-notification may involve communication via visible, infrared, ultraviolet, or other types of light.

Pre-notification may in some cases involve communicating to one or more motes indication(s) of an absolute time when the mechanical disturbance will be generated. Pre-notification may also involve an indication of a relative time when the mechanical disturbance will be generated (e.g. a number of second or fractions of seconds relative to a current time). Motes may note the time (either absolute or relative, e.g. using logic 109) that the mechanical disturbance was received relative to the time indicated for when the mechanical disturbance was generated. For example, a pre-notification communication may say that the disturbance will be generated in 2 seconds. If 2.01 seconds later, the mote detects the disturbance; 0.01 seconds may be recognized as the elapsed time for that mote.

In some implementations two or more motes of the network may maintain synchronized clocks. A mote may record an absolute time at which a mechanical disturbance is received (detected), and may compare this detected time with time(s) the disturbance is detected by neighboring motes. In this fashion information may be gained about the distances and/or directions between mote neighbors.

In some situations motes may not continuously maintain synchronized clocks. Instead, prior to the mechanical disturbance, the system may provide pre-notification of a time at which motes should synchronize their clocks. . For example, a pre-notification communication received by mote 103 may indicate that it is now 16:00:00 GMT, and a mechanical disturbance will be generated at 16:02:00. Motes receiving the pre-notification may synchronize their clocks (such as clock 108) at 16:00:00. Elapsed time information can be calculated using the clocked time of recognition of the disturbance. Alternatively, the pre-notification may indicate that the motes interact to set a time they agree upon between them.

Layout/Distribution Determination

Motes may detect a mechanical disturbance, and may communicate to one or more central processing facilities (such as 111) information about when the mechanical disturbance was detected in order to facilitate a determination of locations of the motes. Each mote 102-104, upon receipt of the mechanical disturbance, may communicate its identity and when it received the disturbance to near neighbors who pass it on. Ultimately, the information is passed for all motes 102-104 in the network to an external processing facility 111. The logic 113 of the processing facility 113 may develop a composite picture/values of how far the motes 102-104 were from the generating sound. Placement of this calculation within the processing facility 111 may be desirable in applications where the processing facility 111, but not the individual motes 102-104, need to know the mote's location.

Information about when the mechanical disturbance was detected may facilitate a determination of an exterior or interior surface or shape of an object or objects, for example, the shape of region 117 enclosing the motes. Many motes such as motes 102-104 might be distributed in a water medium by sending water into a tunnel believed to open into a side chamber. The inner shape of the tunnel and any openings might then be approximated by recognizing that wherever the motes are, the solid surfaces of the shape are not.

In some cases it may prove useful to apply information about properties of one or more media through which the mechanical disturbance propagates to facilitate the determination of the distribution/layout of the motes. For example, in the example provided above where the dispersing medium was water, information about the velocity of sound in water at a certain temperature may be used when calculating the distance of a particular mote from the disturbance generator.

Layout/distribution determination in multiple dimensions may involve the repeated application of mechanical disturbances, sometimes from different locations. For example, a first mechanical disturbance (e.g. using generator 115) may be provided from a first location, and the motes might record an indication of when the first mechanical disturbance was detected. A second mechanical disturbance might then be generated from a different location (e.g. after moving generator 115, or using a second generator not shown), and the motes might record an indication of when the second mechanical disturbance was detected. The motes, or one or more external processing facilities, may then apply the information about when the first and second mechanical disturbances were detected in order to facilitate determination of a location of the motes in an absolute sense, or in relation to one another. Differences between when the mechanical disturbance was detected by various motes may be applied toward this determination, as may be detected strength, frequency, duration, or repetition of the mechanical disturbance.

Acoustic Stimulation of a Mote Network

Figure 2:
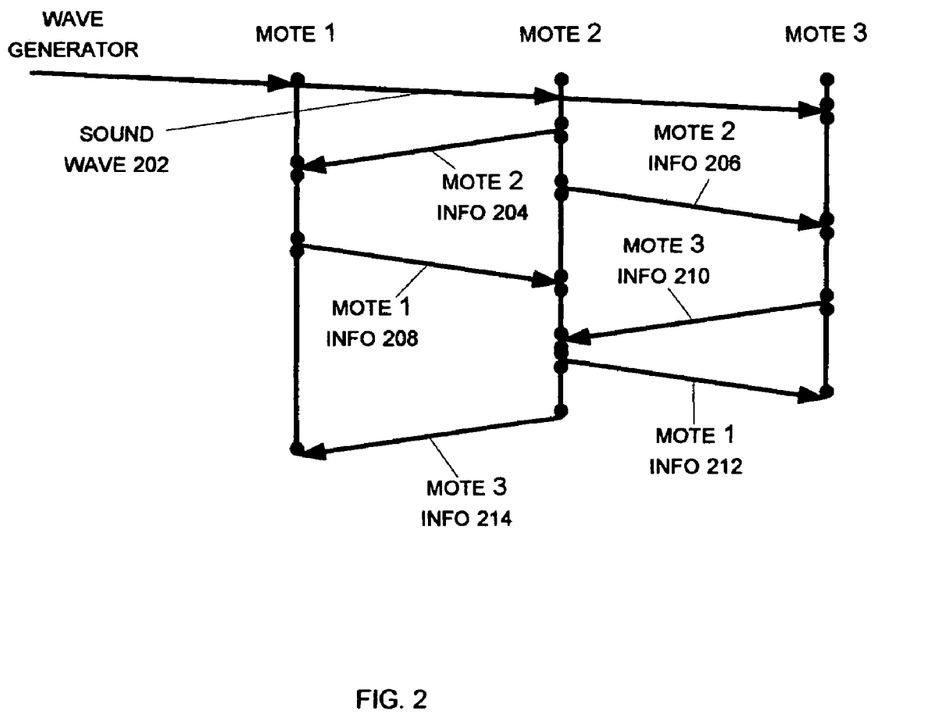
FIG. 2 is an action flow diagram of an embodiment of acoustic stimulation of a mote network.

FIG. 2 is an action flow diagram of an embodiment of acoustic stimulation of a mote network.

At 202 a sound wave produced by an acoustic generator propagates across a mote network. A first mote (mote 1) detects the sound wave first, and notes the time. The wave propagates onward to a second mote (mote 2), which detects the wave and notes the time. The wave further propagates to a third mote (mote 3), which detects the wave and notes the time.

The motes exchange information about when the wave was detected. Mote 2 communicates information about when it detected the wave. At 204 this information is received by mote 1; at 206, this information is received by mote 3. Note that mote 2 may simply broadcast this information, but due to power constraints the information may be received only by motes that are closer to mote 2 (e.g. neighbors).

Mote 1 communicates information about when it detected the wave. At 208 this information is received by mote 2. Mote 3 communicates information about when it detected the wave, and at 210 this information is received by mote 2.

Mote 2 communicates information about when the wave was detected by other motes. At 214 information about when mote 3 detected the wave is received by mote 1. At 212 information about when mote 1 detected the wave is received by mote 3.

As re-broadcast of information continues throughout the network, motes may gain knowledge of the distribution/layout of neighboring motes, and even non-neighboring motes.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote computing/communication systems, combined with engineering practices. Specific examples of such components entail such as Intel Corporation's and/or Crossbow Corporation's mote components and supporting hardware, software, and firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
    at least one mote of a mote network detecting a mechanical disturbance; and
    the at least one mote applying information about when the mechanical disturbance was detected in order to facilitate determination of a location of the at least one mote with respect to at least one other mote.

2. The method of claim 1, further comprising:
    the at least one mote responding to different mechanical disturbance characteristics than the at least one other mote.

3. The method of claim 1, wherein the at least one mote of a mote network detecting a mechanical disturbance further comprises:
    the at least one mote applying a sensor element tuned to one or more particular mechanical wave frequencies.

4. The method of claim 1, wherein the at least one mote of a mote network detecting a mechanical disturbance further comprises:
    the at least one mote detecting one or more of a strength, frequency, duration, or repetition of the mechanical disturbance.

5. The method of claim 1, wherein the at least one mote applying information about when the mechanical disturbance was detected in order to facilitate determination of a location of the at least one mote with respect to at least one other mote further comprises:
    the at least one mote sharing information about when the mechanical disturbance was detected in order to facilitate a determination of a distance between the at least one mote and the at least one other mote.

6. The method of claim 1, wherein the at least one mote applying information about when the mechanical disturbance was detected in order to facilitate determination of a location of the at least one mote with respect to at least one other mote further comprises:
    the at least one mote applying information about when the mechanical disturbance was detected in order to facilitate determination of which one or more motes are nearest neighbors.

7. The method of claim 1, further comprising:
    the at least one mote responding to the mechanical disturbance with information about one or more of an intensity of the disturbance, frequency, tone, and/or pitch of the disturbance, mote identification, mote status, or location of the mote or motes that detected the disturbance.

8. The method of claim 7, wherein the at least one mote responding to the mechanical disturbance with information about one or more 9fan intensity of the disturbance, frequency, tone, and/or pitch of the disturbance, mote identification, mote status, or location of the mote or motes that detected the disturbance further comprises:

the at least one mote communicating to one or more neighboring motes the one or more of an intensity of the disturbance, frequency, tone, and/or pitch of the disturbance, mote identification, mote status, or location of the mote or motes that detected the disturbance.

9. The method of claim 1, further comprising:
the at least one mote prior to receiving a mechanical disturbance receiving an indication of a time at which the at least one mote should synchronize a clock with at least one other mote.

10. The method of claim 9, further comprising:
the at least one mote and at least one other mote synchronizing one or more clocks at the time indicated by the indication.

11. The method of claim 1, further comprising:
the at least one mote receiving an indication to be alert for the mechanical disturbance prior to detecting the mechanical disturbance.

12. The method of claim 11, wherein the at least one mote receiving an indication to be alert for the mechanical disturbance prior to detecting the mechanical disturbance further comprises:
the at least one mote receiving an indication of when the mechanical disturbance will be generated.

13. The method of claim 12, wherein the at least one mote receiving an indication of when the mechanical disturbance will be generated further comprises:
the at least one mote receiving an indication of an absolute time when the mechanical disturbance will be generated.

14. The method of claim 12, wherein the indication of when the mechanical disturbance will be generated further comprises:
an indication of a relative time when the mechanical disturbance will be generated.

15. A method comprising:
at least one mote of a mote network detecting a mechanical disturbance; and
the at least one mote communicating to a central processing facility information about when the mechanical disturbance was detected in order to facilitate a determination by the central processing facility of a location of the at least one mote.

16. The method of claim 15, wherein the at least one mote of a mote network detecting a mechanical disturbance further comprises:
at least one mote applying signal processing logic to facilitate detection of the mechanical disturbance.

17. The method of claim 15, further comprising:
applying information about one or more properties of one or more media through which the mechanical disturbance propagates to facilitate the determination of the location of the motes.

18. A method comprising:
at least one mote of a mote network detecting a mechanical disturbance; and
the at least one mote communicating to a central processing facility information about when the mechanical disturbance was detected in order to facilitate a determination by the central processing facility of a shape of an object or objects comprising the at least one mote.

19. The method of claim 18, wherein the at least one mote of a mote network detecting a mechanical disturbance further comprises:
at least one mote applying signal processing logic to facilitate detection of the mechanical disturbance.

20. A method comprising:
at least one mote detecting a first mechanical disturbance;
the at least one mote recording an indication of when the first mechanical disturbance was detected;
the at least one mote detecting a second mechanical disturbance;
the at least one mote recording an indication of when the second mechanical disturbance was detected; and
the at least one mote applying information about when the first and second mechanical disturbances were detected in order to facilitate determination of a location of the at least one mote with respect to at least one other mote.

21. A system utilizing at least one mote, each mote comprising at least one of (a) a processor or (b) hardware or (c) firmware or (d) a computer readable storage media storing software, which when executed causes the at least one of the processor or the hardware or the firmware of the mote to perform the functions of:
detecting a mechanical disturbance; and
applying information about when the mechanical disturbance was detected toward determination of a location of the at least one mote with respect to at least one other mote.

22. The system utilizing the at least one mote of claim 21, wherein applying information about when the mechanical disturbance was detected toward determination of a location of the at least one mote with respect to at least one other mote further comprises:
applying one or more differences between when the mechanical disturbance was detected by the mote and when the mechanical disturbance was detected by at least one other mote.

23. The system utilizing the at least one mote of claim 21, wherein applying information about when the mechanical disturbance was detected toward determination of a location of the at least one mote with respect to at least one other mote further comprises:
applying information about when the mechanical disturbance was detected in order to facilitate determination of which motes are nearest neighbors of the mote.

24. The system utilizing the at least one mote of claim 21, wherein each mote comprising at least one of (a) a processor or (b) hardware or (c) firmware or (d) a computer readable storage media storing software, which when executed causes the at least one of the processor or the hardware or the firmware of the mote to further perform the function of:
synchronizing a clock with at least one other mote.

25. The system utilizing the at least one mote of claim 21, wherein each mote comprising at least one of (a) a processor or (b) hardware or (c) firmware or (d) a computer readable storage media storing software, which when executed causes the at least one of the processor or the hardware or the firmware of the mote to further perform the function of:
recording an absolute time at which the mechanical disturbance is received.

26. The system utilizing the at least one mote of claim 21, wherein detecting a mechanical disturbance further comprises:
detecting one or more of a strength, frequency, duration, or repetition of the mechanical disturbance.

27. The system utilizing the at least one mote of claim 26, wherein detecting one or more of a strength, frequency, duration, or repetition of the mechanical disturbance further comprises:
detecting one or more patterns of repetition of the mechanical disturbance.

28. The system utilizing the at least one mote of claim 21, wherein each mote comprising at least one of (a) a processor or (b) hardware or (c) firmware or (d) a computer readable storage media storing software, which when executed causes the at least one of the processor or the hardware or the firmware of the mote to further perform the function of:

applying a received indication to be alert for the mechanical disturbance prior to detecting the mechanical disturbance.

29. The system utilizing the at least one mote of claim 28, wherein applying a received indication to be alert for the mechanical disturbance prior to detecting the mechanical disturbance further comprises:

receiving and applying an indication of when the mechanical disturbance will be generated.

30. The system utilizing the at least one mote of claim 29, wherein receiving and applying an indication of when the mechanical disturbance will be generated further comprises:

receiving and applying an indication of a relative time when the mechanical disturbance will be generated.

31. The system utilizing the at least one mote of claim 30, wherein receiving and applying an indication of a relative time when the mechanical disturbance will be generated further comprises:

recording a time that the mechanical disturbance was received relative to the time when the mechanical disturbance will be generated.

\* \* \* \* \*